United States Patent
Trutna et al.

(10) Patent No.: US 10,020,876 B2
(45) Date of Patent: Jul. 10, 2018

(54) SYSTEMS AND METHODS FOR COMMAND AND CONTROL OF SATELLITE CONSTELLATIONS

(71) Applicant: Spire Global, Inc., San Francisco, CA (US)

(72) Inventors: Jesse Trutna, Eureka, CA (US); Roshan Jobanputra, San Francisco, CA (US); Robert Deaton, San Francisco, CA (US)

(73) Assignee: SPIRE GLOBAL INC., San Francisco, CA (US)

( * ) Notice: Subject to any disclaimer, the term of this patent is extended or adjusted under 35 U.S.C. 154(b) by 52 days.

(21) Appl. No.: 15/221,908

(22) Filed: Jul. 28, 2016

(65) Prior Publication Data

US 2018/0034536 A1    Feb. 1, 2018

(51) Int. Cl.
*H04B 7/185*    (2006.01)

(52) U.S. Cl.
CPC ..... *H04B 7/18519* (2013.01); *H04B 7/18513* (2013.01); *H04B 7/18521* (2013.01)

(58) Field of Classification Search
CPC ........................................ H04B 7/185–7/2128
USPC ................................ 455/12.1–13.3; 370/316
See application file for complete search history.

(56) References Cited

U.S. PATENT DOCUMENTS 4,454,510 A    6/1984  Crow
5,410,728 A    4/1995  Bertiger et al.
5,506,780 A  * 4/1996  Montenbruck ...... B64G 1/1085
                                                   244/158.8
5,604,920 A    2/1997  Bertiger et al.
(Continued)

FOREIGN PATENT DOCUMENTS

EP    1037405 A2    9/2000
KR    2006063622  *  6/2006
WO    2014121197 A2    8/2014

OTHER PUBLICATIONS

"GPS at Geosynchronous Orbit", Policy and Strategic Communications Office, Space Communications and Navigation (SCaN) Program.*

(Continued)

*Primary Examiner* — Raymond Dean
(74) *Attorney, Agent, or Firm* — Troutman Sanders LLP

(57) ABSTRACT

The disclosed technology relates to systems and methods for tasking satellite constellations. A method is disclosed herein for receiving, from a resource database of a satellite control system, knowledge data corresponding to a plurality of components associated with a satellite constellation communications system. The plurality of components can include one or more satellites associated with a constellation. The method includes processing the knowledge data according to at least one received mission objective. Processing the knowledge data can include determining a status of at least one satellite in the constellation. The method includes scheduling the satellite control system based at least in part on the received mission objective and the processed knowledge data; initiating communication with the at least one satellite in the constellation according to the scheduling; receiving updated status information for at least one component of the plurality of components; and storing, in the resource database, the updated status information.

20 Claims, 8 Drawing Sheets

(56) References Cited

U.S. PATENT DOCUMENTS

| | | | |
|---|---|---|---|
| 5,940,739 | A | 8/1999 | Conrad et al. |
| 5,963,166 | A | 10/1999 | Kamel |
| 6,067,453 | A | 5/2000 | Adiwoso et al. |
| 6,271,877 | B1 | 8/2001 | LeCompte |
| 6,381,228 | B1 | 4/2002 | Prieto, Jr. et al. |
| 6,584,452 | B1 | 6/2003 | Prieto, Jr. et al. |
| 8,411,969 | B1 | 4/2013 | Joslin et al. |
| 2003/0217362 | A1 | 11/2003 | Summers et al. |
| 2004/0263386 | A1 | 12/2004 | King et al. |
| 2007/0182628 | A1 | 8/2007 | Pomerantz et al. |
| 2008/0071633 | A1 | 3/2008 | Ozkan et al. |
| 2009/0007240 | A1 | 1/2009 | Vantalon et al. |
| 2009/0290534 | A1 | 11/2009 | Connors et al. |
| 2011/0116441 | A1 | 5/2011 | Wyler |
| 2012/0018585 | A1 | 1/2012 | Liu et al. |
| 2012/0068863 | A1* | 3/2012 | Tillotson ............... G01S 13/003 340/963 |
| 2013/0018529 | A1 | 1/2013 | Ploschnitznig |
| 2013/0062471 | A1* | 3/2013 | Lim ..................... B64G 1/1007 244/158.6 |
| 2013/0309961 | A1* | 11/2013 | Lim ..................... H04B 7/1851 455/13.3 |
| 2014/0325569 | A1* | 10/2014 | Suzuki ............... H04N 21/6193 725/67 |
| 2014/0335780 | A1* | 11/2014 | Rosen ................ H04B 7/18578 455/12.1 |
| 2016/0041267 | A1* | 2/2016 | Robinson ............. G01S 11/026 342/357.51 |
| 2016/0112117 | A1* | 4/2016 | Platzer ............... H04B 7/18513 370/316 |

OTHER PUBLICATIONS

Carson-Jackson ("Satellite AIS—Developing Technology or Existing Capability?", the Journal of Navigation (2012), 65, 303-321).

European Search Report dated Jul. 22, 2016 issued in corresponding European Patent Application No. 14745871.5.

International Search Report and Written Opinion dated Apr. 27, 2016 issued in corresponding PCT International Application No. PCT/US2015/054906.

* cited by examiner

SYSTEMS AND METHODS FOR COMMAND AND CONTROL OF SATELLITE CONSTELLATIONS

RELATED APPLICATION

This application is related to U.S. patent application Ser. No. 14/515,142, filed 15 Oct. 2014, entitled "Satellite Operating System Architecture Testing and Radio Communication System," and published as U.S. Patent Publication US 2016/0112117 on 21 Apr. 2016, the contents of which are incorporated by reference as if presented in full.

FIELD

This disclosed technology relates to command and control of satellites, and in particular, to systems and methods for efficiently tasking satellite constellations.

BACKGROUND

As more satellites are deployed into orbit to work in concert with other satellites in a constellation, the control and command of these satellites becomes more complex. As the size of a constellation grows, its operation becomes more expensive and complex. The historic method of manually tasking satellites by human operators is not scalable enough to meet the demands of large satellite constellations.

It is likely that most successful commercial satellite constellations will include numerous CubeSats, given their small form factor. CubeSats are generally deployed in low orbits, thereby limiting the length of communication windows in which the CubeSats and their related ground station networks can "talk" to each other. This can make manual commanding time consuming, inefficient at best, and completely ineffective at worst, particularly in constellations that include a variety of satellites having different capabilities and different versions of hardware and/or software. Small constellations having just a few (<10) satellites, can sometimes be controlled (with limited success) by a dedicated operator issuing manual commands. However, as more satellites are deployed in a constellation to provide improved spatial coverage, reduced revisit time, and reduced message latency, etc., the control of such a constellation can create many challenges in data collection, power management, processing, communications, coordination, etc. A need exists for improved systems and methods to address such challenges.

BRIEF SUMMARY

Some or all of the above needs may be addressed by certain embodiments and implementations disclosed herein. Certain implementations of the disclosed technology may include scalable systems and methods for efficiently tasking satellite constellations. For example, certain implementations may provide appropriate communications and commands, issued within appropriate time windows, for coordinating individual satellite behavior in concert with the other satellites in the constellation. Certain example implementations may enable efficient command and control of a group of satellites having a variety of different capabilities, hardware, operating systems, and/or software/firmware versions.

In accordance with an example implementation of the disclosed technology, a method is provided that can include receiving, from a resource database of a satellite control system, knowledge data corresponding to a plurality of components associated with a satellite constellation communications system. The plurality of components can include one or more satellites associated with a constellation. The method can include processing the knowledge data according to at least one received mission objective. Processing the knowledge data can include determining a status of at least one satellite in the constellation. The method can include scheduling the satellite control system based at least in part on the received mission objective and the processed knowledge data; commanding at least one satellite of the one or more satellites to take a specified action based at least in part on the mission objective; initiating communication with the at least one satellite in the constellation according to the scheduling; receiving updated status information for at least one component of the plurality of components; and storing, in the resource database, the updated status information.

According to another example implementation, a satellite communications system is provided that can include a central command and control system configured for communication with at least one satellite associated with a constellation, and by at least one ground station. The system includes at least one memory for storing data and computer-executable instructions. The at least one memory can include a resource database configured for storing knowledge data corresponding to a plurality of components associated with the satellite constellation communications system, wherein the plurality of components include the at least one satellite associated with the constellation. The system further includes at least one processors in communication with the at least one memory. The at least one processor is configured to execute the computer-executable instructions to cause the system to: receive, from the resource database, the knowledge data; process the knowledge data according to at least one received mission objective, wherein processing the knowledge data can include determining a status of the at least one satellite in the constellation; schedule the satellite constellation communications system based at least in part on the received mission objective and the processed knowledge data; command at least one satellite of the one or more satellites to take a specified action based at least in part on the mission objective; initiate, by the at least one ground station, communication with the at least one satellite in the constellation according to the scheduling; receive updated status information for at least one component of the plurality of components; and store, in the resource database, the updated status information.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology may however, be embodied in many different forms and should not be construed as limited to the implementations set forth herein. Some of the components illustrated in the accompanying figures are shown for illustration purposes only, and may or may not be drawn to scale. In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
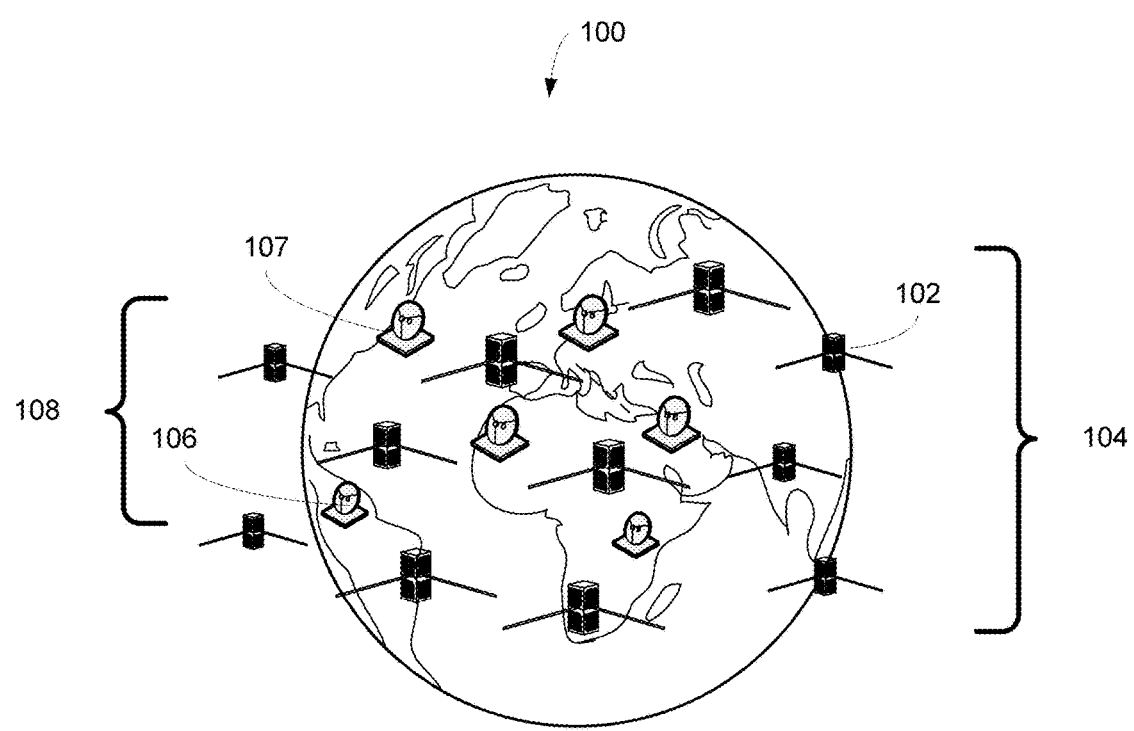
FIG. 1 depicts an example system 100 having a constellation 104 of satellites 102.

The disclosed technology generally relates to an orbital and terrestrial communication network and control thereof. FIG. 1 depicts a satellite system 100 (not to scale), according to an example implementation of the disclosed technology. The system 100 can include a constellation 104 of satellites 102 deployed into orbit. According to certain example implementations of the disclosed technology, the satellites 102 may comprise CubeSats deployed into low earth orbit. As defined herein, and according to an example implementation of the disclosed technology, a CubeSat may be generally defined as a class of nano-satellites, with dimensions approximately less than 10 cm×10 cm×30 cm, and having approximately 10 kg of mass or less. For example, a CubeSat can be based on an industry standard, developed in 2001 by Stanford University and California Polytechnic Institute, and described in the document "satellite Design Specification." While CubeSats (and/or similar miniaturized satellites having an approximate 1 liter of useful volume) are depicted and discussed herein, the disclosed technology is not limited to CubeSats, and may be applied to a wide variety of satellites in a constellation.

In certain example implementations, the satellite system 100 may also include a plurality of ground stations 108. The ground stations 108, for example can include one or more transmit/receive ground stations 106 configured for transmitting/receiving information to/from one or more of the satellites 102 in the constellation 104. According to an example implementation of the disclosed technology, the ground stations 108 can include one or more receive-only ground stations 107 (passive receivers) configured for tracking and receiving information from one or more of the satellites 102 in the constellation 104. The receive-only ground stations 107 may be configured to receive, but not to transmit due to licensing and other restrictions or regulations. As disclosed herein, the ground stations 108 can include the transmit/receive ground stations 106 and the receive-only ground stations 107, where appropriate. In certain example implementations, the satellites 102 may send messages to one or more receive-only ground stations 107 according to a schedule. In certain example implementations, the receive-only ground stations 107 may receive transmissions from the satellites 102 without prompting for transmission.

Figure 2:
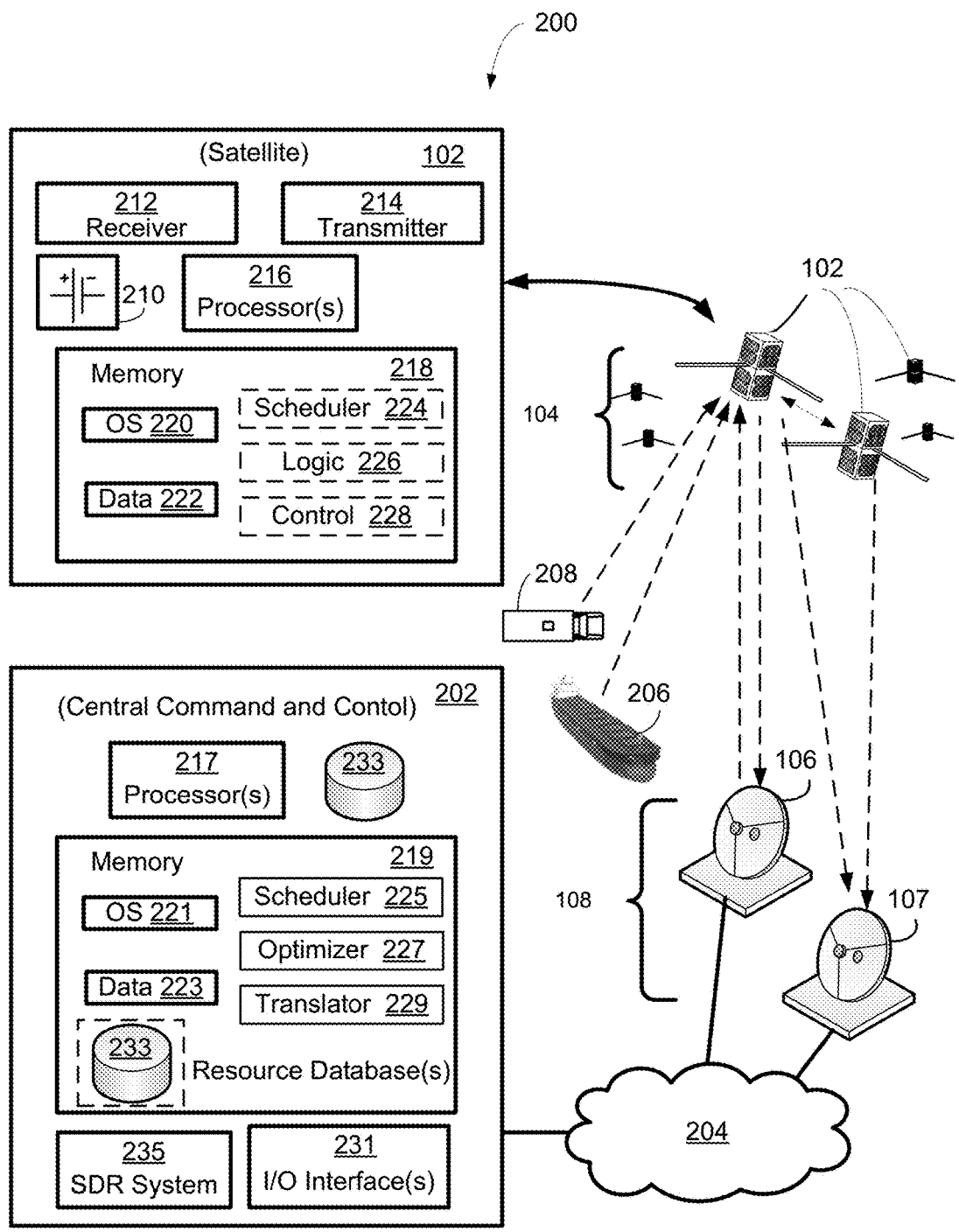
FIG. 2 depicts an example command and control system 200, according to an example implementation of the disclosed technology.

FIG. 2 is a block diagram depicting certain components that may form part of a satellite command and control system 200, according to an example implementation of the disclosed technology. For example, the system 200 can include a plurality of satellites 102 forming a constellation 104 and configured for communication with one or more ground stations 108 (which can include transmit/receive ground stations 106 and/or one or more receive-only ground stations 107). The ground stations 108 may be in communication with a central command and control (CCC) 202, for example, via one or more communication networks 204. In certain example implementations, one or more of the satellites 102 in the constellation 104 may be configured to receive communications from the transmit/receive ground stations 106, transmitters associated with corresponding ocean vessels 206, and/or transmitters associated with other mobile vehicles 208.

In an example implementation, the ground stations 108 may be in communication with a terrestrial network (which may be part of the network 204) and in certain embodiments, may not require a wireless transmission capability. In some example implementations, certain ground stations 108 can be configured to redirect incoming data to the CCC 202 via a network traffic relay device, for example, to avoid delays.

In an example implementation, the receive-only ground station(s) 107 can include a synchronized clock and a program schedule for incoming data. For example, a condition-based scheduler using high-speed transfer protocol may be utilized. In this example implementation, a need for a request-response may be reduced or eliminated, and the data received may pass through to the CCC 202. In an example implementation, the satellites 102 may be aware their own location, time, and location of the ground station. In certain example implementations, a scheduler may direct a satellite 102 to transmit its data to a single or multiple ground station(s) 108 without the need for a prompt.

In accordance with an example implementation of the disclosed technology, one or more of the satellites 102 may be programmed to operate semi-autonomously, for example, if it doesn't receive communication from a ground station. Certain example implementations may be utilized to propagate transit generation and/or a schedule of future contacts to a satellite 102, which may enable the satellite 102 to autonomously pre-prepare for data transmission. For example, the autonomous pre-preparation may include orienting the satellite, enabling radio communication, disabling sensitive payloads, encoding most valuable data for transmission, etc.

In an example implementation, the control system 200 may be part of (or function as) an Automatic Identification Systems (AIS). In general, AIS can be used by ocean vessels 206 to actively broadcast information about their heading, speed, location, and other information, which can allow companies, governments, and other interested parties to plot the ship's course, avoid collision with other ships and reefs, monitor ship-related activity, and to aid in accident investigation and in search and rescue operations. Satellite based AIS (S-AIS), for example, may utilize data received by a satellite for identifying, locating, and/or tracking ships at sea.

In accordance with an example implementation of the disclosed technology, each satellite 102 can include an on-board transmitter 214 for communicating with one or more of the ground stations 108. In accordance with an example implementation of the disclosed technology, each satellite 102 can include an on-board receiver 212 for receiving information from the transmit/receive ground stations 106, transmitters associated with corresponding ocean vessels 206, and/or other transmitters 208. In some implementations, two or more of the satellites 102 may be configured to communicate with each other, and/or with other satellites 102 in the constellation 104. In some embodiments, the satellites 102 may communicate with non-satellite satellites. For example, the satellites 102 may also communicate with permanent, large satellites, such as dish network located at 23k miles geostationary orbit. In certain example implementations, each satellites 102 may be identified by a unique identifier, such as a media access control (MAC) address. According to an example implementation of the disclosed technology, one or more of the satellite 102 may communicate with more than one ground station 108 at a time.

In certain example implementations, the satellites 102 can include one or more batteries 210 for supplying power to the various on-board components. One or more of the batteries 210, for example, may be recharged via small on-board solar panels. In an example implementation, the satellites 102 can include one or more on-board processors 216 in communication with the receiver 212 and the transmitter 214. According to an example implementation of the disclosed technology, the one or more processors 216 may be selectively programmed to perform various functions.

According to an example implementation of the disclosed technology, the satellites 102 can include a memory 218 in communication with the one or more processors 216. The memory 218 can include an operating system 220 and data 222. In accordance with an example implementation of the disclosed technology, one or more configurable modules can be stored in the memory 218. In one example implementation, a scheduler module 224 may be utilized to cause the one or more processors 216 to initiate certain functions at scheduled time.

According to an example implementation of the disclosed technology, a satellite 102 may be programmed to implement certain future operations and/or tasks according to a schedule. For example, in one implementation, a satellite 102 may be pre-programmed for initial and subsequent operation. Such pre-programming may enable a satellite to autonomously update one or more of its own initial operating system, initial communications protocol, initial schedule, etc. In certain example implementations, the autonomous update may be performed according to a schedule or a prompting from a ground station. In this respect, newer versions of an operating system 220, for example, may be brought on-line within certain satellites 102 of the constellation 104 at a predetermined or selected time.

In certain example implementations, a logic module 226 may be utilized, for example, to work with the processor(s) 216 to control functions of the satellite 102 based on certain conditions. In some implementations, the logic module 226 may work in tandem with the scheduler 224 and the transmitter 214, for example, to control transmission of data packets to the ground station 108 based on certain conditions, such as adequate battery power, for example. In certain example implementations, the logic module 226 may provide state information of the associated satellite 102 for communicating with the CCC 202, for example, so that the CCC 202 may have updated information to optimize and coordinate functions among the satellites 102 associated with the constellation 104.

In an example implementation, the satellite 102 memory 218 can include a control module 228. According to an example implementation of the disclosed technology, the control module 228 may be utilized to work with the various components associated with the satellite 102. For example, the control module 228 may include a translation function, which may accept as input, for example, from the scheduler module 224 or the logic module 226, relatively simple reference commands, which may invoke verbose commands as required for controlling other on-board processes. For example, the scheduler module 224 may provide an instruction to the processor 216 such as "send data xxyyzz to the CCC." However, the actual process of sending such data may also involve certain preparations, such as powering-up the transmitter, formatting the data with error correction, selecting the proper ground station 108 for receipt of the data packets, etc. Thus, in certain example implementations, the control module 228 may be utilized to handle some of the low-level processes, as needed.

FIG. 2 also depicts a central command and control (CCC) 202 in communication with the satellite constellation 104 via the communication network 204 and the associated ground stations 108. According to an example implementation of the disclosed technology the CCC 202 may include one or more processors 217 in communication with one or more input-output interfaces 231, which may be in communication with the communication network 204. According to an example implementation of the disclosed technology, the one or more processors 216 may be selectively programmed and/or work in conjunction with various modules, etc., associated with the CCC 202.

According to an example implementation of the disclosed technology, the CCC 202 can include a memory 219 in communication with the one or more processors 217. The memory 219 can include an operating system 221 and data 232. According to one optional example implementation of the disclosed technology, the memory 219 may include a resource database 233. In certain example implementations, the resource database 233 may be a separate component in communication with the one or more processors 217.

In accordance with an example implementation of the disclosed technology, the resource database 233 (whether it is included as part of the memory 219, or whether it is a stand-alone database) can include a comprehensive listing of all or part of the assets/resources of the system 200, along with associated detailed information about the particular asset/resource. Each asset/resource represented in the resource database 233 may include a plurality of linked records, each record comprising a plurality of fields, each field associated with an aspect of the asset/resource, and capable of containing a field value descriptive of the aspect. For example, the resource database 233 may account for each of the satellites 102 in the constellation 104, along with a current (or last known) position of each satellite 102, current (or last known) battery level, transmitter type(s) associated with the particular satellite 102, software/firmware versions of the satellite 102, etc. In accordance with an example implementation of the disclosed technology, the resource database 233 may include detailed information regarding the ground stations 108 associated with the system 200, including locations capabilities, limitations, IP addresses, current status, local weather patterns that could disrupt communication with the satellites 102, etc.

In an example implementations, the CCC 202 memory 219 may include one or more modules for interaction with the resource database 233 and the processor 217 to provide efficient control of the constellation 104, for example, based on the available resources and associated statuses. In one example implementation, the memory 219 can include a scheduler module 225. In an example implementation, the memory 219 can include an optimizer module 227. In an example implementation, the memory 219 can include a translator module 229. According to an example implementation of the disclosed technology, the scheduler module 225 may receive commands (for example, via the one or more input/output interfaces 231) for performing a function or service, such as "Monitor AIS data for Ship X in the Atlantic Ocean between date Y and date Z." Based on the particular input request, the scheduler module 225 may work in conjunction with the resource database 233 and/or the optimizer module 227 to prepare an actionable schedule of commands for sending to targeted satellites 102 in the constellation 104, for example, to perform the requested function or service with enhanced efficiency, based on the available resources.

In accordance with an example implementation of the disclosed technology, the optimizer module 227 may act as a bridge between the resource database 233 and the scheduler module 225, for example, to prepare and optimize the actionable schedule of commands, with timing, etc. In certain example implementations, the optimizer module 227 may rely on historical data and/or future projections to provide an optimized and/or efficiency-enhanced schedule of commands.

In accordance with an example implementation of the disclosed technology, the translator module 229 may be configured to work in conjunction with the scheduler module 225 and/or the optimizer module 227. For example, the initial schedule of commands, as provided by the scheduler module 225 and/or the optimizer module 227 may further involve generating certain low-level preparation commands for formatting the data with error correction, selecting the proper ground station 106 for uploading data packets to a particular satellite 102, etc. Thus, in certain example implementations, the translator module 229 may be utilized to handle some of the low-level processes, as needed.

In one example implementation, an optimizer module 227 may be utilized in conjunction with the scheduler module 225 to cause the one or more processors 217 to initiate certain functions at scheduled time. Thus, certain example implementations of the disclosed technology may utilize the scheduler module 225, the optimizer module 227, the translator module, 229, and/or other modules/processes to efficiently control the constellation 104 by considering available resources.

In accordance with an example implementation of the disclosed technology, one or more of the components and/or functions associated with the ground stations 108 and/or the satellite 102, (including but not limited to the receiver 212, transmitter 214, operating system 220, data 222, scheduler module 224, logic module 226 and/or the control module 228, etc.,) as discussed above may be reconfigurable via communication with software-defined radio (SDR) system 235. In one example implementation, the SDR system 235 may be associated with the CCC 202. In certain example implementations, the SDR system 235 may operate with the one or more transmit/receive ground stations 106, for example to communicate with a satellite 102.

In certain example implementations, the SDR system 235 may control or interact with one or more of the ground stations 108, for example, to establish the physical layer communication among the CCC 202, the ground stations 108, and the satellites 102. For example, the SDR may modulate and demodulate information received by a ground station 108 as well as information to be transmitted from the ground station 108. In certain example implementations, the SDR may allow each ground station 108 to be reconfigured dynamically so as to communicate with a wide variety of present and future satellites 102 without requiring site visits or hardware installation.

In certain example implementations, the SDR system 235 may be a radio communication system that implements typical hardware components, such as mixers, filters, amplifiers, modulators or demodulators, and detectors, by software means. For example, the SDR system 235 may configure components on a satellite 102 to perform demodulation, filtering of radio frequency or audio frequency, and signal enhancement.

In certain example implementations, the SDR system 235 may include and/or implement one or more of the following: a receiver, a transmitter, an antenna, an analog-to-digital converter, an amplifier, and a digital signal processor that reads from the converter and transfers stream of data from the converter to other applications. In accordance with an example implementation of the disclosed technology, the receiver 212 of the satellite 120 may include a SDR receiver, for example, to implement one or more transmission links with or one or more ground stations 108. The receiver 212 may use a variable-frequency oscillator, mixer and filter to tune a desired signal to a common intermediate frequency or baseband, where it may be then sampled by an analog-to-digital converter. In an example implementation, the transmitter 214 of the satellite 120 may include a SDR transmitter, for example, to form one or more transmission links with one or more satellites 102, other satellites, and/or one or more ground stations 108.

Figure 3:
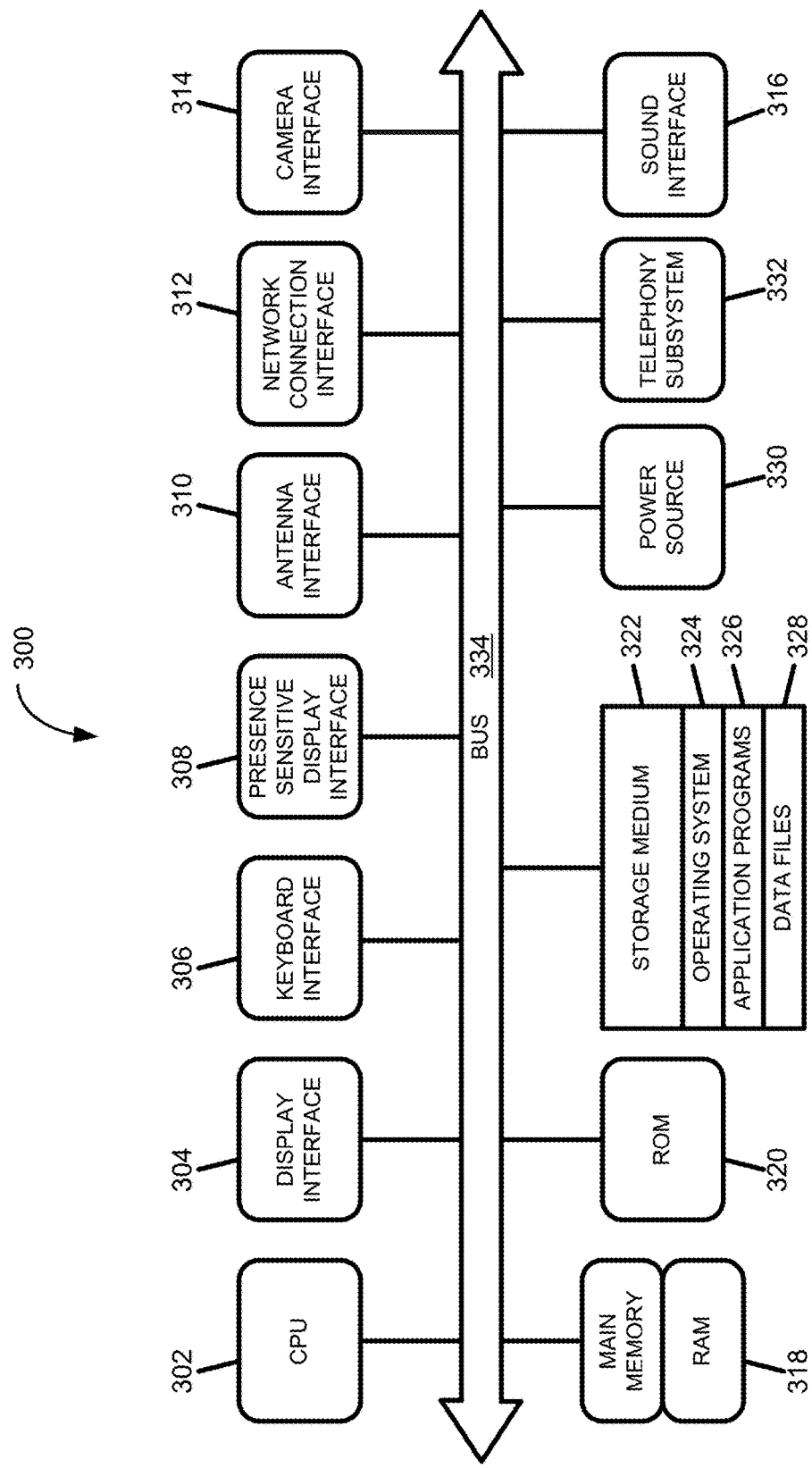
FIG. 3 depicts a block diagram of an illustrative computing device 300 according to an example implementation of the disclosed technology.

FIG. 3 depicts a block diagram of an illustrative computing device 300 according to an example implementation. Certain aspects of FIG. 3 may be embodied in a satellite, a ground station, and/or a central command and control (for example, the satellites 102 and/or ground stations 108 as shown in FIGS. 1 and 2, and/or the CCC 202 as shown in FIG. 2). According to one example implementation, the term "computing device," as used herein, may be a CPU, processor, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a processor and associated components, for example, that may be installed and reside on satellites in a constellation (such one or more satellites 102).

In certain example embodiments, a satellite may have various sensors connected to and in communication with a CPU (such as the CPU 302 of FIG. 3). For example, the sensors can include one or more of the following: a frequency specific monitor such as UV (Ultraviolet) and IR (infrared), a sensor for remote detection of surface temperature, a spectrometer (UV and/or IR, for example), an accelerometer, a camera or vision system for still and video capture, a gravimetric sensor, a radar, and a radio transceiver, among other possibilities. In certain example implementations, a satellite may embody a computing device that includes memory (such as memory 318 depicted in FIG. 3) to store data collected by one or more sensors.

In an example implementation, the computing device (particularly if representing the CCC 202) may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.,) to allow capturing information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and/or an optical sensor.

Certain example implementations of the computing device 300 may include an antenna interface 310 in communication with an antenna. For example, certain satellites (such as the satellites 102 as shown in FIGS. 1-2) may include one or more light antennas with high gain capabilities. Certain example implementations of the antenna interface 310 can include one or more of: a receiver, analog-to-digital converter, sampler, buffers, memory, and memory. Certain example implementations can include a network connection interface 312 that provides a communication interface to a network. In certain implementations, a camera interface 314 may act as a communication interface to provide functions for capturing digital images from a camera. In certain implementations, a sound interface 316 may be provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored. In accordance with certain example implementations of the disclosed technology, the application programs 326 can include one or more of programs to dynamically adjust the various parameters, such as one or more of: data packet size; data chunk size; data coding rate; number of re-transmits on uplink; number of tolerated timeouts; maximum transmission time; data compression parameters; bit rate factors; recovery factors; resource burden factors; batching; latency control; advance filtering; etc., as previously described.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a navigation system. In another example implementation, the term computing device, as used herein, may refer to a satellite processor.

A technical benefit of the disclosed technology is that it provides scalable systems and methods for handling a very large number of tasks across a very large satellite constellation and ground station network. Another technical benefit of the disclosed technology is that it enables efficient control of system having heterogeneous ground stations issuing a variety of commands to heterogeneous satellites. Certain example implementations may provide the technical benefit of operating third party constellations with different technical specifications, operational capabilities, and even different communication frameworks. Certain example implementations may provide systems and methods that can be used directly in satellite-related business operations. Certain example implementation may provide satellite operation services to third parties.

Figure 4:
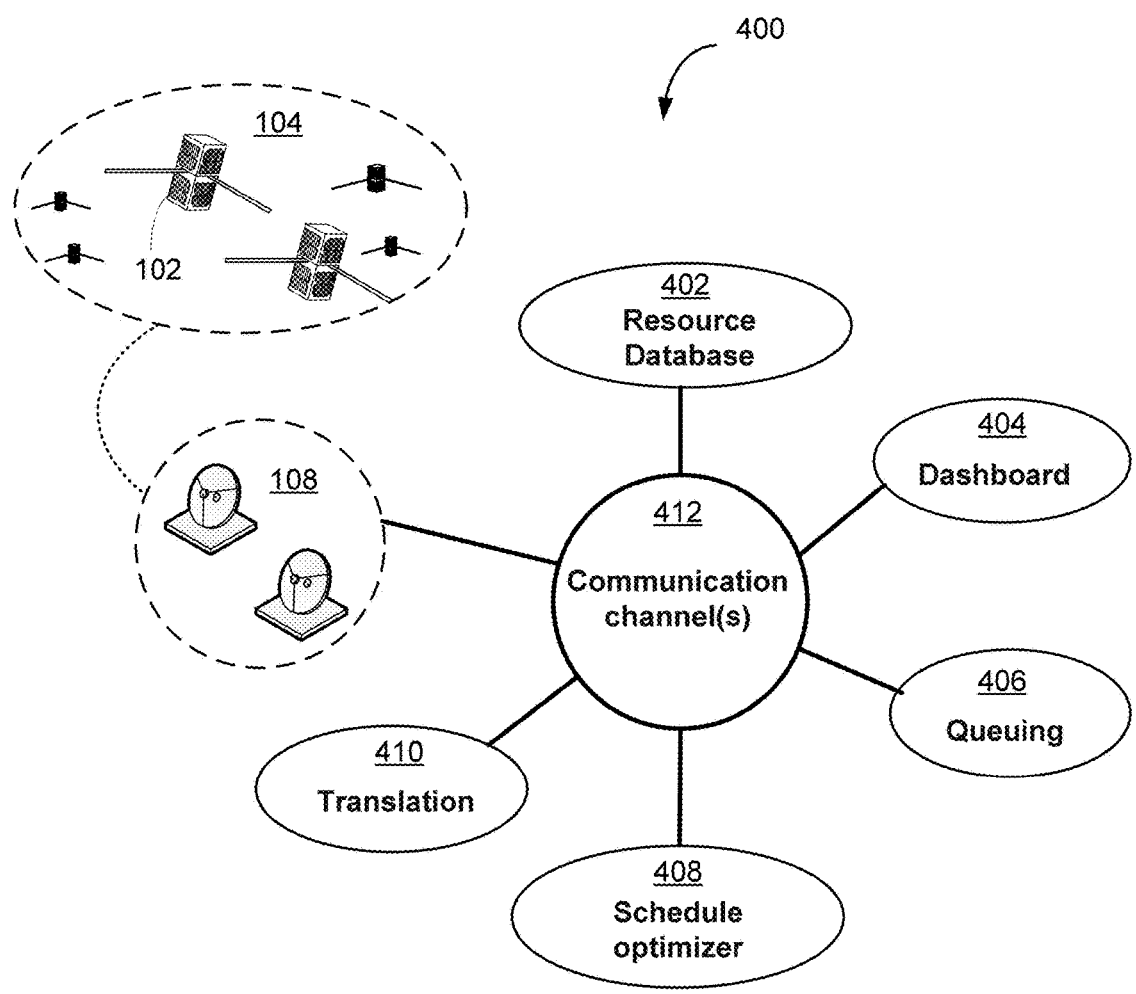
FIG. 4 depicts an example conceptual control and automation system 400 for communicating with and controlling a constellation 104 of satellites 102 via one or more ground stations 108, according to an example implementation of the disclosed technology.

FIG. 4 depicts an example conceptual control and automation system 400 for communicating with and controlling a constellation 104 of satellites 102 via one or more ground stations 108, according to an example implementation of the disclosed technology. Certain example implementations of the system 400 may be utilized for tasking satellite constellations 104 that can be fully automated with minimal human intervention. Certain example implementation of the control and automation system 400 may be embodied in the central command and control 202 as discussed above with reference to FIG. 2.

In accordance with an example implementation of the disclosed technology, the control and automation system 400 may include certain components that may be combined into one service and run on one processor. In another example implementation, the components may be segmented into different services and/or different processors. In certain example implementations, the system 400 can include (but is not limited to) a resource database 402 (which may be embodied as the resource database 233, as discussed with reference to FIG. 2); a dashboard 404 including a user interface; a queuing system 406 (which may be embodied as the scheduler 225, as discussed with reference to FIG. 2); a schedule optimizer 408 (which may be embodied as the optimizer 227, as discussed with reference to FIG. 2); and a translation layer 410 (which may be embodied as the translator 229, as discussed with reference to FIG. 2). As indicated, the various components of the system 400 may be in communication with other components via one or more communication channels 412, which may include one or more wired and/or wireless networks, terrestrial and/or space communication networks, one or more processors, one or more communication interfaces, channels, etc. Thus, according to an example implementation of the disclosed technology, the components of the system 400 may utilize each other's information and/or service for a flexible and unified approach to controlling the constellation 104 of satellites 102 in communication with the ground stations 108.

In accordance with an example implementation of the disclosed technology, and as discussed previously, the resource database 402 may include an accounting of all assets/resources available in the system. For example, each asset/resource may be represented in the resource database 402 via a plurality of linked records, each record comprising a plurality of fields, each field associated with an aspect of the asset/resource, and capable of containing a field value descriptive of the aspect. In certain example implementations, the resource database 402 may include an updated status of the system resources, such as how the resources are being used at any point in time. As an example, the resource database 402 may include (and update) information such as:
  (i) number of satellites in the system;
  (ii) owners of the satellites;
  (iii) each satellites' mission capabilities (i.e., imaging at 12.5 m PAN resolution, collecting AIS Type I messages, taking radio occultation soundings in the ionosphere, etc.);
  (iv) each satellites' radio and communication limitations (i.e., transmit only at 420 MHz);
  (v) satellite command message format and specifications;
  (vi) the orbital/telemetry information necessary to determine where a satellite is at any one time;
  (vii) number of ground stations in the system;
  (viii) ground station geographic positions;
  (ix) technical and regulatory limitations on what area of the sky the ground station can cover and for how long;
  (x) each ground station's radio and communication limitations (i.e., transmit in 420 MHz, receive in 2020 MHz, power, antenna gain, etc.); and/or
  (xi) ground station download bandwidth.

With continued reference to FIG. 4, a dashboard 404 may be in communication with the other components of the system 400 via one or more communication channels 412. In accordance with an example implementation of the disclosed technology, the dashboard 404 may be used to provide satellite operators with a user interface in which to monitor satellite operations, to enter outcomes that the operator wants a satellite constellation or constellations to achieve, and/or to task satellites manually (if needed).

Satellite missions are typically outcome based, and may involve interpreting human readable instructions to produce a desired outcome. For example, an instruction entered into the dashboard 404 may essentially correspond to an analogous form of a mission such as: "take radio occultation measurements over the United States East Coast," or "track AIS messages from vessels in the South China Sea on Tuesday from 5 PM Pacific to 8 PM Pacific." As may be appreciated by those having skill in the art, such high-level commands may involve translation, coordination, and numerous interactions among the various components to carry out particular tasks, and may involve generating many lower level commands in a format that can be processed by the system 400. Traditionally, such missions and associated tasks have been carried-out by skilled engineers who manually enter commands and/or scripts. Such traditional method of control may be inefficient, as it may be impossible for a human to keep track of all of the constraints and changing variables. Certain example implementations of the disclosed technology may allow the initiation and completion of certain mission and/or tasks by higher-level commands, requiring much less knowledge of and/or manual attention to the underlying sub-process details. Thus, one technical benefit of the disclosed technology is that it may allow operators with minimal technical capabilities to execute sophisticated satellite missions and associated tasks. In accordance with certain example implementations of the disclosed technology, missions and/or associated task may be initiated and carried out by interaction with certain software modules via the dashboard 404. In certain example implementations, one or more command templates from previous missions may be reused. In certain example implementations, information from previous missions may be built upon and improved. As may be appreciated, the underlying technology for satellite communications and the associated command and control may be improved with certain implementations of the disclosed technology.

The control and automation system 400, as disclosed herein, may also include a queuing system 406 in communication with the other components of the system 400 via one or more communication channels 412. According to an example implementation of the disclosed technology, the queuing system 406 may receive new missions (and associated instructions) via the dashboard 406, for example. In certain example implementations, the missions may be stored and queued according to predetermined objectives, priorities, and constraints. In certain example implementations, the queuing system 406 may execute the stored missions in order of priority as resources become available that satisfy the constraints. Certain implementations of the queuing system 406 may work in conjunction with the resource database 402 and other components of the system 400 to construct instructions and/or to revise the order of the instruction in the queue. In accordance with an example implementation of the disclosed technology, the queuing system 406 may generate a log with result information from each mission execution. An updated status may then be reported back to the dashboard 404 for operator review, and/or for improvement of future similar missions by reuse and enhancement of schedules etc., and based on the optimization of the available resources.

The control and automation system 400 may also include a scheduling optimizer 408 in communication with the other components of the system 400 via one or more communication channels 412. In certain example implementations, the scheduling optimizer 408 may calculate all possible transits for every possible satellite 102 and ground station 108 combination, along with the associated available windows of communication. The scheduling optimizer 408 may consequently determine what allocation of communication time best contributes to the execution of current and/or projected future missions. In certain example implementations, the scheduling optimizer 408 can allocate portions of transits to different satellites or potentially overlap communication to multiple satellites which are located in the same part of the sky during their transits. Said another way, the schedule optimizer 408 may receive missions from the queuing system 406, along with information regarding the available resources from the resource database 402, and the schedule optimizer 408 may determine which available ground station 108 and satellites 102 should be tasked to satisfy the set of missions the most efficiently.

One of the difficulties encountered in attempting to control satellites across different constellations is that certain constellations may have different requirements for the formatting of the command messages. In fact, even satellites of different versions within the same constellation may have different command message requirements. Therefore, a mission issued in the dashboard 404 may not necessarily work for all satellites in a heterogeneous system if it is issued in only one format or language. According to an example implementation of the disclosed technology, once a satellite 102 (or group of satellites 102 in a constellation 104) is selected to execute a given mission, the operational steps of the mission may be converted by the translation layer 410 into a format that the particular selected satellite 102 can understand. The translation layer 410 may reference the resource database 402, which may contain all the messaging requirements and API definitions for each individual satellite 102. In accordance with an example implementation of the disclosed technology, the translation layer 410 may convert the commands generated by the mission into the necessary format required to task each such satellite 102.

According to an example implementation of the disclosed technology, the resource database 402 may utilize various resource burden factors in terms of their contribution to communications efficiency. In some implementations, the resource burden factor may be defined in terms of a percentage use of an available resource. For example, a satellite 102 may include a battery with a limited amount of stored power for peak, continuous, and/or intermittent operation of on-board processors, receivers, and transmitters. Certain example implementations of the disclosed technology provide an optimized communication schedule that can account for the limited resources for efficient use. In another example implementation, a given receiver may be capable of receiving communications from a plurality of transmitters operating at different times. However, the receiver may become "overburdened" by multiple simultaneous transmission streams. In terms of data processing resources, such resource burden can be affected by a high volume of data, data surges, data congestion, and/or multiple handshakes/acknowledgements. Certain example implementations of the disclosed technology may help manage some of the burdens placed on the available resources.

According to an example implementation of the disclosed technology, the resource database 402 may take into account a recoverability factor, which can have a significant contribution in terms of communications efficiency. Recoverability, in this sense, can generally be defined as the ability to recover or reproduce data that has been corrupted or lost (for example, due to noise or partial transmission) during the communications process. For example, depending on the encoding, forward error correction (FEC) with redundant packets can take up a significant percentage of available bandwidth in a satellite communications link. Certain example implementations of the disclosed technology provide a flexible communication protocol that can balance certain trade-offs with respect to recoverability. Certain implementations may adjust data redundancy and/or encoding to achieve target recoverability, for example, based on other factors such as noise, limited communications window, timeliness of the data, importance of the data, etc.

In accordance with an example implementation of the disclosed technology, and based on the mission, instructions and/or requested data may be compressed, chunked, packetized, and/or encoded with forward error correction. Certain example implementations may determine the optimal data characteristics for the given transmission, and packets may be tuned for the maximum transmission unit (MTU) of the given network link. For example, small chunk data sizes and/or small compression windows may be utilized for processing and transmitting AIS data.

Chunked transfer encoding is a data transfer mechanism in which data is sent in a series of "chunks" and the transmitting end does not need to know the length of the content before it starts transmitting. For example, the transmission can include dynamically-generated content before knowing the total size of that content. In an example implementation, an indication of the size of each chunk may be sent before sending the chunk itself so that the receiver can tell when it has finished receiving data for that chunk. In certain example implementations, the data transfer may be terminated by a final chunk of length zero.

According to certain example implementations of the disclosed technology, the various parameters associated with one or more of compression, chunk size, packet size, and/or error correction may be tuned to optimize certain metrics, such as latency. Certain example implementations may tolerate a higher loss of some data and perform partial recovery to get partial data, which may still be useful.

As may be recognized by those having skill in the art, the scheduling, queuing, optimization, translation, etc., based on available resources as described herein, may affect one or more performance aspects, such as latency, bit error rates, an ability to recover corrupted data, burden on resources, etc. In some embodiments, the optimization of certain parameters may correlate with more than a single resulting performance aspect of the satellite communications link, and therefore, the process carried out by the schedule optimizer 408 may include trade-offs to adjust the various parameters to achieve a balanced result. For example, if low latency is the top priority (such as may be the case with AIS messages), the data packet size and/or the data chunk size may be adjusted for small values, while allowing a large number of timeouts. In another example implementation, if minimizing the drain on the battery is a priority, the transmit time and number of timeouts may be set to low values.

In accordance with an example implementation of the disclosed technology, the various available resources may be selected and utilized to affect and/or improve communications efficiency. For example, an effective bit-rate can be influenced by a number of factors including but not limited to noise, re-transmission of data due to errors, transmit power, error correction encoding/decoding, etc. Certain example implementations of the disclosed technology may provide a flexible, tunable optimization process to enhance the efficiency of the communication and control of the various resources.

Figure 5:
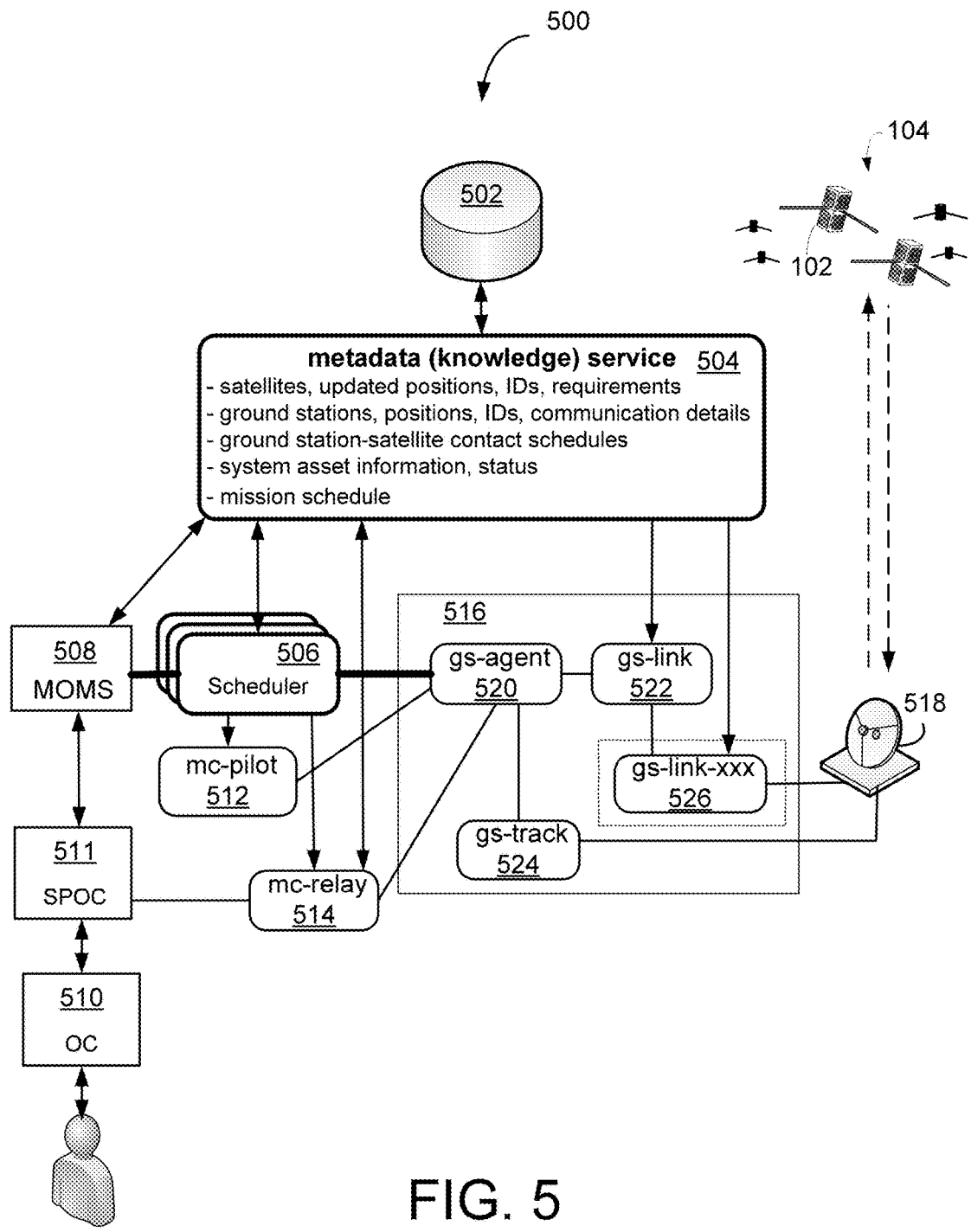
FIG. 5 is a block diagram of an example Ground Station Operation Automation Platform (GSOAP) system 500, according to an example implementation of the disclosed technology.

FIG. 5 is a block diagram of an example Ground Station Operation Automation Platform (GSOAP) 500, according to an example implementation of the disclosed technology. Certain components of the GSOAP 500 may be implemented in machine-readable code, software, firmware, or the like. Certain example implementation of the GSOAP 500 may work in conjunction with special purpose hardware. The GSOAP 500 may improve the efficiency, speed, and/or performance of a satellite communications system. Certain example components of the GSOAP 500 may be the same as, similar to, and/or work in conjunction with some of the components previously discussed herein.

For example, certain example implementations of a central command and control (such as the CCC 202 as discussed with respect to FIG. 2) may be the same or similar to the GSOAP 500. In certain example implementations, the GSOAP 500 can include a database 502 or storage repository of information about the various components involved in a satellite communications system. In certain example implementations, the database 502 may be the same or similar database as discussed previously (for example, the resource database 223 as discussed above with reference to FIG. 2, and/or the resource database 402 as discussed above with reference to FIG. 4).

According to an example implementation of the disclosed technology, the database 502 may be in communication with, and provide information to, a metadata service 504. In certain example implementations, the database 502 may be updated to reflect current or last known status, position, available resources, etc., of the various components and/or assets associated with the satellite communications system. In some implementations, the metadata service 504 may update the database 502 with the latest available information.

In accordance with an example implementation of the disclosed technology, the metadata service 504 may retrieve from the database 502, a listing of satellites meeting certain criteria. For example, the listing may include all of the satellites associated with a particular constellation. In certain example implementations, the listing can include identification information for the satellites (such as flow graph names), requirements (including required arguments for control, etc.), ground station identification information, contact schedules (such as time windows for satellite-ground station communications), up-to-date satellite and/or ground station position information such as latitude, longitude, elevation, etc.

In certain example implementations, the metadata service 504 may access, compute, and/or provide a two-line element (TLE) set of data for representing or estimating the position of a satellite at a particular point in time. For example, the TLE data may be determined with knowledge of the position and velocity of a satellite at any given point in time. Such TLE information may be utilized to predict a future position of the satellite. According to an example implementation of the disclosed technology, the metadata service 504 may utilize such information to provide current and/or predicted positions of the satellites.

In accordance with an example implementation of the disclosed technology, and with continued reference to FIG. 5, the GSOAP 500 can include a scheduler 506. In certain example implementations, the scheduler 506 may create a tunable, optimized assignment of satellites to ground stations over a specified time window, based on the information from the database 502 and/or the metadata service 504. In certain example implementations, the scheduler 506 may perform the same (or similar) function(s) as previously discussed (for example, with respect to the scheduler module 225 as discussed with reference to FIG. 2, the queuing system 406, and/or the schedule optimizer 408 as discussed with reference to FIG. 4). In certain example implementations, the scheduler 506 may receive and/or provide information from a mission operation and management system (MOMS) 508. Certain example implementations of the MOMS 508 may operate autonomously without human intervention, and will be further discussed below.

Certain example implementations of the disclosed technology may utilize a SPOC library 511. In an example implementation, the SPOC library 511 may be embodied in the translation layer (for example, the translation layer 410 as depicted and discussed with reference to FIG. 4, and/or the translation layer 229 as depicted discussed above with reference to FIG. 2). According to an example implementation of the disclosed technology, the SPOC library 511 may be implemented in or as a software library and may be configured to provide a uniform API across different satellites. In an example implementation, the SPOC library 511 may utilize the knowledge service 504 to translate high-level commands into a sequence of low-level commands needed for a particular satellite and task. For example, the SPOC library 511 may be used to issue a command such as "capture this data" to a particular module. In certain example implementations, the SPOC library 511 may enable the mission to be written once and run for the entire constellation.

In certain example implementations, the translation layer (for example, the translation layer 410 as depicted and discussed with reference to FIG. 4, and/or the translation layer 229 as depicted discussed above with reference to FIG. 2) may be supported by both the ground control and the satellite. For example, the same (or similar) libraries and routines developed to operate the satellite from the ground may be transmitted to, pre-programmed on, or otherwise configured on a satellite to reduce the amount of control traffic required or for out-of-contact or autonomous execution. In this respect, certain example implementations may enable a mission to autonomously introspect and install necessary functionality before continuing its operation.

Certain example implementations of the disclosed technology may include an operators console (OC) 510. In certain example implementations, the OC 510 may be utilized for operator interaction with the GSOAP 500 system, and will be discussed further below with regard to FIG. 7.

According to an example implementation of the disclosed technology, the MOMS 508 may integrate with the GSOAP 500 (for example, via the dashboard 404 as discussed with reference to FIG. 4) to facilitate a stable and autonomous system that can be used for command and control of the satellite constellation through predefined missions, and to remove the dependency on human operators in certain real-time satellite communications. In accordance with an example implementation of the disclosed technology, the MOMS 508 and/or the SPOC library 511 may be utilized to provide a user-friendly user interface via the OC 510 for managing the GSOAP 500 system. In one example implementation, the MOMS 508 may be utilized to reorganize mission queues and priorities on the fly, for example, which may be necessitated due to changing, telemetry, system health, operational priorities, and/or customer requirements.

To further highlight some of the aspects of the MOMS 508, it may be instructive to further discuss the GSOAP 500 and the role played by the MOMS 508 in the GSOAP 500. In an example implementation, the GSOAP 500 may be responsible for managing the distributed ground station network by creating satellite contact schedules and then actuating the ground stations during the contacts. For example, each ground station may run an "agent" which can start the tracking system to move the ground station rotors and configure/enable software defined radio (SDR) flow graphs to allow communication to the satellite via a predetermined "data" port. In an example implementation, A "mission control" server at the center of the GSOAP 500 network may run a "pilot" which may read a contact schedule and may command the ground station agents to "initiate contacts" at the appropriate time with specific parameters. In certain example implementations, these agents can also be commanded locally on each ground station via an operator console. Operators, for example, may be responsible for starting clients (Nash, STP) on the mission control server to send/receive data to specific satellites via the data relay setup by GSOAP 500, which may forward traffic on to the correct ground station during contacts.

In accordance with an example implementation of the disclosed technology, a mission may be a pre-built docker image. In certain example implementations, the MOMS 508 may provide certain high level information to the docker entry point (for example, satellite id, contact length, data port, etc) but it may not be required to know what is defined inside the docker. Utility scripts allow easy creation of "missions" from nash command files, python scripts, combos of both, etc. Mission metadata may be stored in the resource database and/or the metadata service, while docker images may be hosted in a docker registry server.

In accordance with an example implementation of the disclosed technology, the dashboard and/or utility scripts may allow the assignment of missions to a queue for each satellite stored and referenced by the resource database and/or metadata service. In accordance with an example implementation of the disclosed technology, missions can be repeated multiple times in a queue and given different parameters, etc. In certain example implementations, each satellite may support being assigned teardown missions.

In accordance with an example implementation of the disclosed technology, the a mission control pilot 512 associated with the GSOAP 500 may call a MOMS API during the lifecycle events of each contact in a similar way that it may calls the ground station agents 520. In accordance with an example implementation of the disclosed technology, the MOMS API may listen for these events (initiate contact, terminate contact) and may exposes similar utilities (get status, get logs, etc). In certain example implementations, MOMS 508 may be responsible for starting and stopping missions and managing the satellite mission queues. In accordance with an example implementation of the disclosed technology, and during a contact, MOMS 508 may run the missions off the top of the queue for each satellite. In an example implementation, MOMS 508 may proceed to the next mission if a positive exit code is received, or else it may retry the mission up to a retry cap.

In accordance with an example implementation of the disclosed technology, a mission priority list may be created to organize missions with different constraints and priorities. This priority list may be used along with data from the GSOAP contact schedules by an optimization algorithm to create a mission queue for each satellite, which may attempts to maximize the mission priorities across the constellation.

In accordance with an example implementation of the disclosed technology, MOMS 508 may run an optimization algorithm whenever new telemetry or operational data is received. This algorithm may use constraint maximization function to reassign mission priorities based upon its inputs (constellation health, customer requirements, operational duties, etc.) and create a new mission priority list.

In accordance with an example implementation of the disclosed technology, and with continued reference to FIG. 5, the scheduler 506 of the GSOAP 500 may be in communication with a plurality of ground stations via one or more networks (such as the network 204, as discussed with reference to FIG. 2). For simplicity purposes, FIG. 5 depicts one particular ground station system 516 and one associated transmitter/receiver 518 for communication with one or more satellites 102 in a constellation 104. In accordance with an example implementation of the disclosed technology, the GSOAP 500 can include a ground station system 516, which may include a ground station agent daemon 520. In an example implementation, the ground station agent daemon 520 may receive actuation commands (for example from the scheduler 506) to initiate contact with a particular satellite. In certain example implementations, the ground station agent daemon 520 may initiate status commands for providing link and/or tracking status, for example, to the scheduler 506 and/or to the metadata service 504. In this way, the condition of the link between a particular transmitter/receiver 518 and a desired satellite 102 may be monitored, and corrective action can be implemented according to a predetermined or calculated action.

In accordance with an example implementation of the disclosed technology, and with continued reference to FIG. 5, the GSOAP 500 may include a mission control pilot 512 (as referred to above). In an example implementation, the mission control pilot 512 may be configured to monitor a schedule as provided by the scheduler 506. In certain example implementations, the mission control pilot 512 may actuate (or attempt to actuate) a particular ground station based on the information provided by the scheduler 506 for achieving a desired outcome.

In accordance with an example implementation of the disclosed technology, and with continued reference to FIG. 5, the GSOAP 500 may include a mission control relay 514. According to an example implementation of the disclosed technology, the mission control relay 514 may forward satellite-addressed packets to a currently assigned ground station based on the contact schedule. In some implementations, the mission control pilot 512 and the mission control relay 514 may work in concert to actuate and provide the addressed packets to a particular ground station.

In accordance with an example implementation of the disclosed technology, the GSOAP 500 may include a ground station link 522, for example, residing at or within a ground station system 516. According to an example implementation of the disclosed technology, the ground station link 522 may be utilized to fetch (or receive) an appropriate flow graph name and to invoke and/or reconfigure a flow or process with appropriate parameters. For example, a communication frequency associated with a particular link 526 may be set by issuing a flow command such as: "gs-link dev11=>gs-link-lemur1--frequency 4.2 . . . ."

In accordance with an example implementation of the disclosed technology, the GSOAP 500 may include ground station tracking module 522, for example, residing at or within a ground station system 516. In an example implementation, the ground station tracking module 522 may be utilized to fetch or receive satellite orbital parameters (TLE, for example as previously discussed), the local ground station position (QTH), and/or other parameters. In certain example implementations, the ground station tracking module 522 may calculate rotor coefficients and/or other parameters as needed to instruct the local transmitter/receiver 518 tracking motor to follow a particular pass geometry of a selected satellite (such as a satellite 102).

Figure 6:
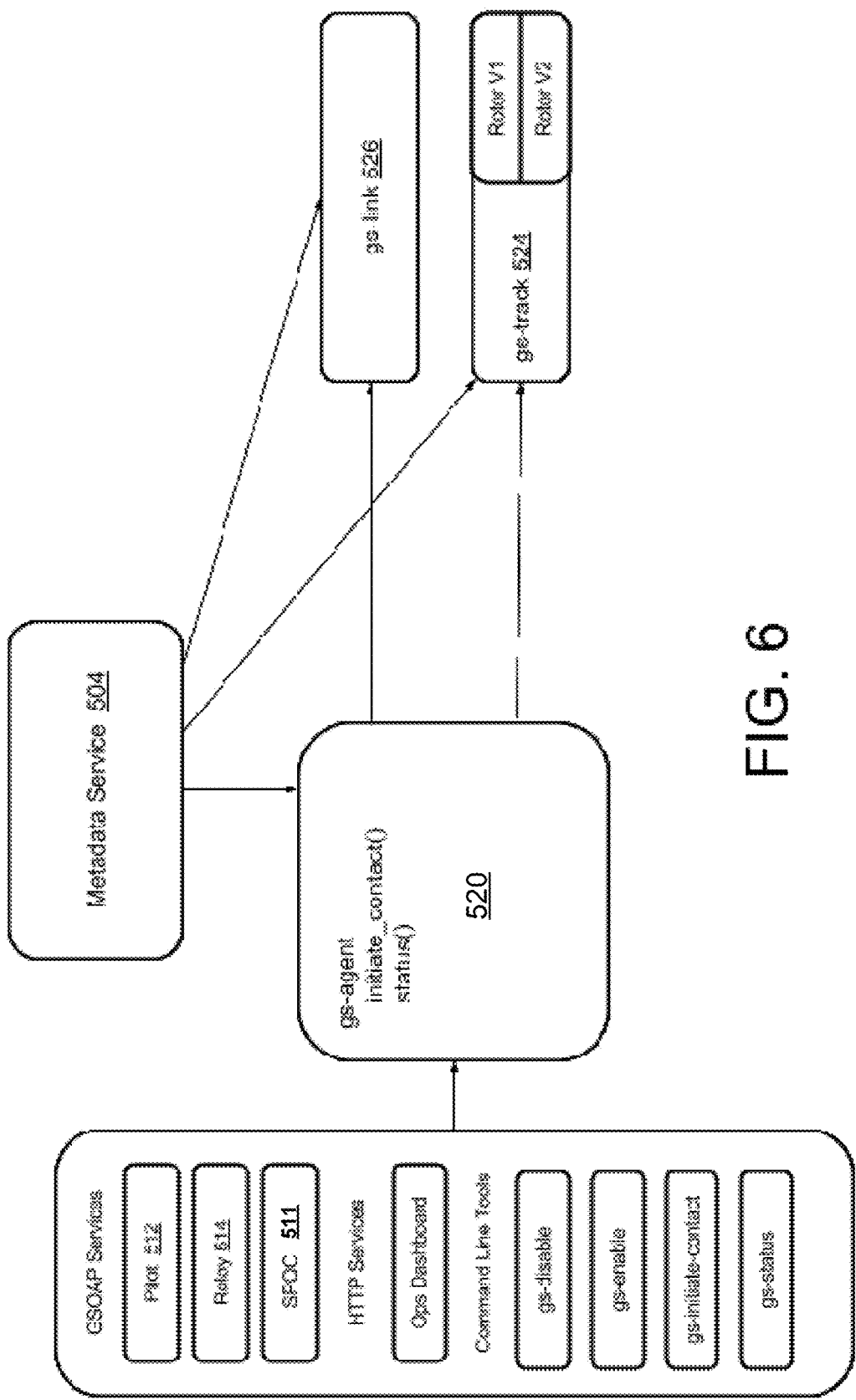
FIG. 6 depicts an example implementation of the ground station agent daemon 520, according to an example implementation of the disclosed technology.

FIG. 6 depicts an example implementation of the ground station agent daemon 520, according to an example implementation of the disclosed technology. FIG. 6 also shows an example of the ground station agent daemon 520 interaction with the metadata service 504, the ground station pilot 512, the mission control relay 514, the SPOC library 511, the ground station tracking module 524, a particular link 526, etc. In an example implementation, the ground station agent daemon 520 may run persistently on each host and may exposes a variety of API calls for the ground station pilot 512 and other remote tools. In one example implementation, ground station agent daemon 520 may function to provide one or more of the following: initiate contacts upon request; monitor and report status of a track and link processes.

Figure 7:
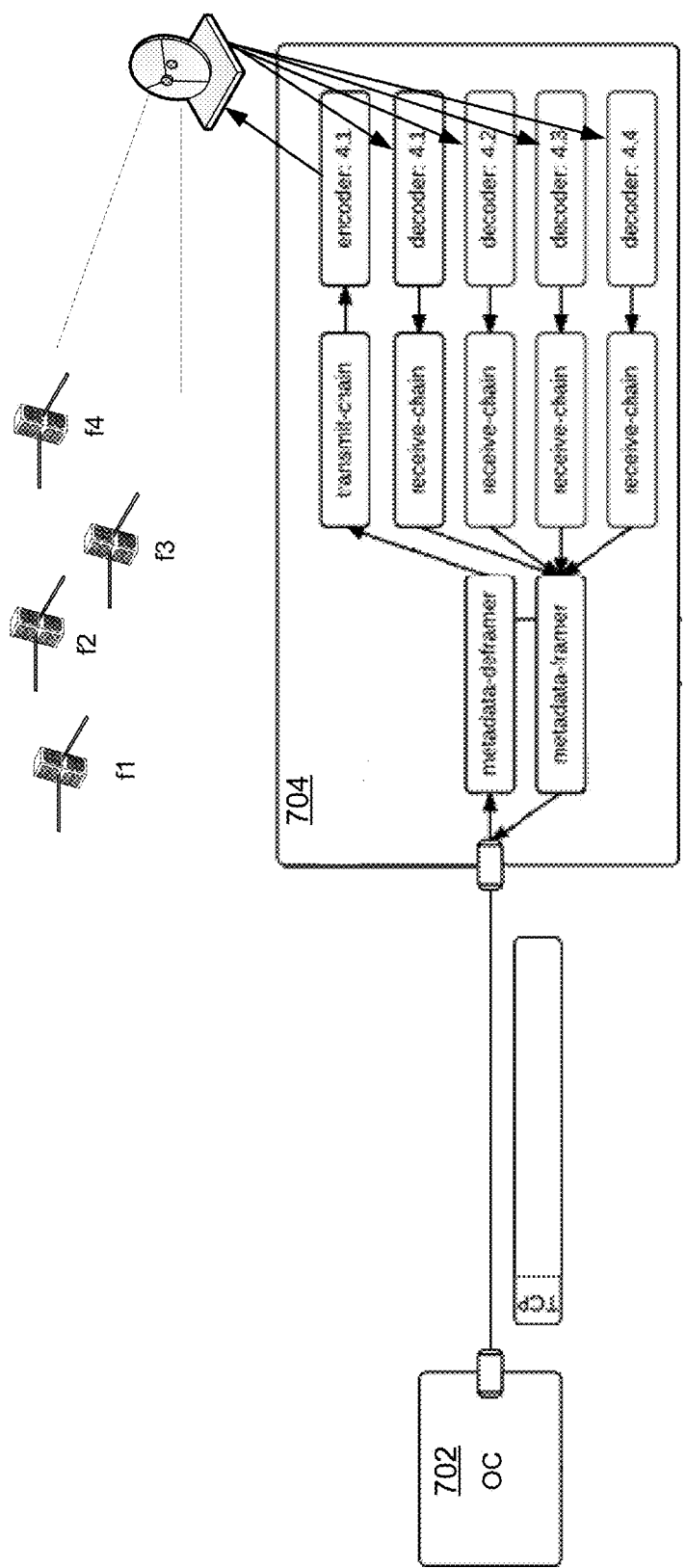
FIG. 7 depicts an example implementation in which an operators console (OC) 702, may be utilized for interaction with the GSOAP system 500, according to an example implementation of the disclosed technology.

FIG. 7 depicts an example implementation in which an operators console (OC) 702, may be utilized for operator interaction with certain modules of the GSOAP system, according to an example implementation of the disclosed technology. In certain example implementations, the OC 702 may be the same a (or similar to) the previously discussed operator console (such as the OC 510 as discussed with reference to FIG. 5). In accordance with an example implementation of the disclosed technology, the OC 702 may be implemented using the Python or other computing language, and may provide a point of input for communication and command tooling.

FIG. 7 also depicts a multi-packet receipt system 704 (that may be part of the ground station system 516, as discussed with respect to FIG. 5). According to an example implementation of the disclosed technology, the multi-packet receipt system 704 may split a UHF frequency allotment into a plurality of bands according to frequencies (or communication bands) assigned to each satellite (f1, f2, f3, f4, etc.). Certain example implementations of the multi-packet receipt system 704 may be configured to receive on a plurality of channels simultaneously, for example to increase throughput, etc., or to take advantage of shared contact time. In an example implementation, the multi-packet receipt system 704 and/or the OC 702 may include a metadata framer configured for use with a flow graph. In one example implementation, the metadata framer may convert incoming and outgoing packets into a JSON string containing the original packet along with associated metadata. In certain example implementations, the packets may be transmitted over a direct TCP connection to the OC 702. In certain example implementations, the multi-packet receipt system 704 can receive any type of packets including, but not limited to beacons. Certain example implementations of the multi-packet receipt system 704 may be configured to transmit on multiple frequencies.

Figure 8:
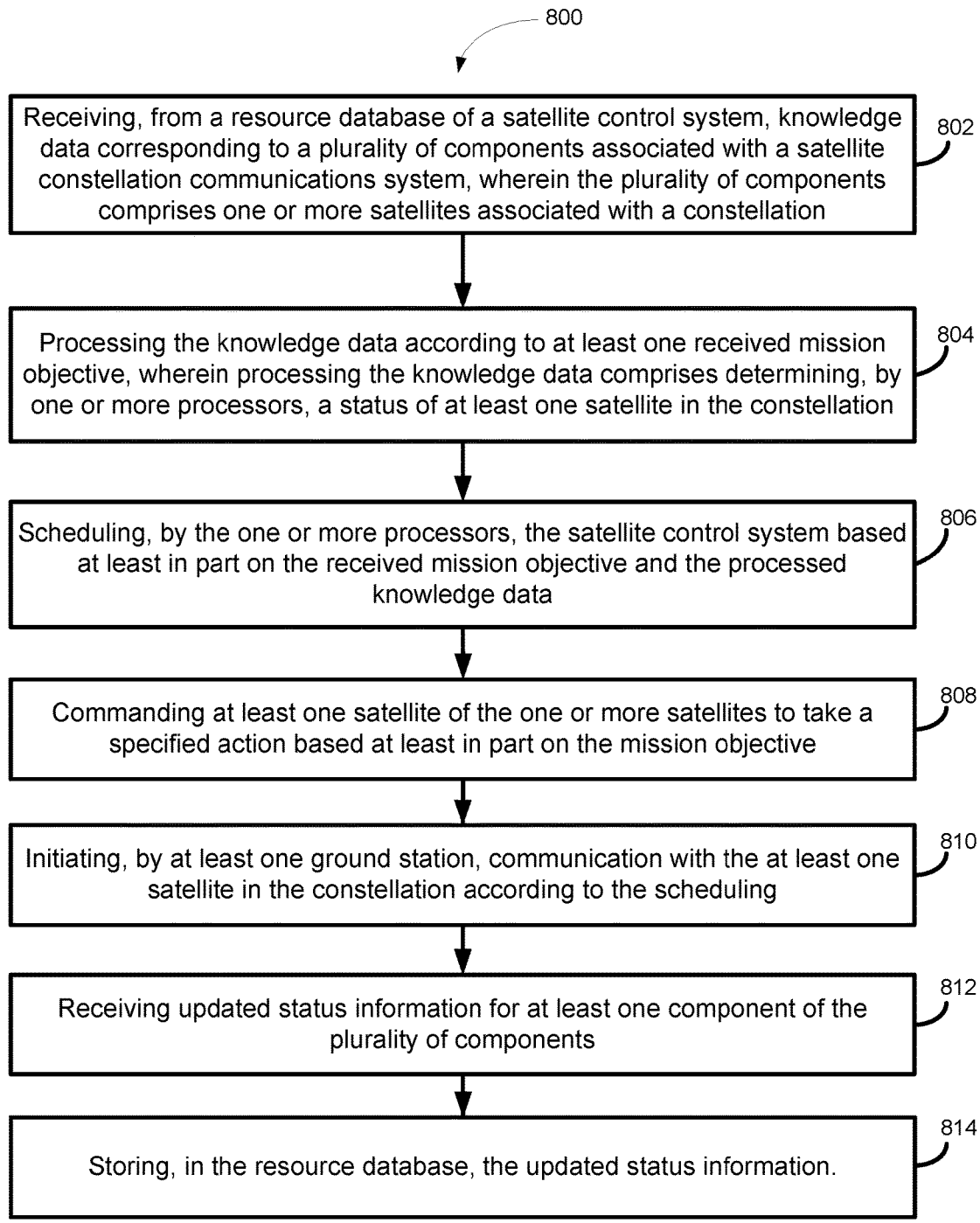
FIG. 8 is a flow diagram of a method 800 according to an example implementation of the disclosed technology.

FIG. 8 is flow diagram of a method 800, according to an example implementation of the disclosed technology. In block 802, the method 800 includes receiving, from a resource database of a satellite control system, knowledge data corresponding to a plurality of components associated with a satellite constellation communications system, wherein the plurality of components comprises one or more satellites associated with a constellation. In block 804, the method 800 includes processing the knowledge data according to at least one received mission objective, wherein processing the knowledge data comprises determining, by one or more processors, a status of at least one satellite in the constellation. In block 806, the method 800 includes scheduling, by the one or more processors, the satellite control system based at least in part on the received mission objective and the processed knowledge data. In block 808, the method 800 includes commanding at least one satellite of the one or more satellites to take a specified action based at least in part on the mission objective. In block 810, the method 800 includes initiating, by at least one ground station, communication with the at least one satellite in the constellation according to the scheduling. In block 812, the method 800 includes receiving updated status information for at least one component of the plurality of components. In block 814, the method 800 includes storing, in the resource database, the updated status information.

In certain example implementations, processing the knowledge data may be performed by a metadata service associated with the satellite control system.

In accordance with an example implementation of the disclosed technology, processing the knowledge data may further include determining a status of at least one communication link of the satellite constellation communications system, wherein the at least one communication link may be capable of communication with the at least one satellite in the constellation according to the mission objective or the scheduling. In certain example implementations, the at one communication link comprises the least one ground station.

According to an example implementation of the disclosed technology, the scheduling may be dynamically revised at any point during the method or process, based on the updated status information.

In certain example implementations, initiating, by the least one ground station can include configuring a software defined radio associated with the at least one ground station.

In certain example implementations, initiating, by the least one ground station can include configuring a software defined radio associated with the at least satellite.

Certain example implementations may include generating, by the one or more processors, translated commands for communication with at least one of the plurality of components associated with the satellite constellation communications system.

According to an example implementation of the disclosed technology, the constellation can include at least one CubeSat. In another example implementation, the entire constellation may be comprised of CubeSats.

In accordance with an example implementation of the disclosed technology, the satellite constellation communications system may comprise a satellite-based Automatic Identification System (S-AIS). In accordance with an example implementation of the disclosed technology, the satellite constellation communications system may comprise GPS Radio Occultation (GPS-RO) system.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
receiving, from a terrestrial resource database of a satellite control system, knowledge data corresponding to a plurality of components associated with a satellite constellation communications system, wherein the plurality of components comprises at least one ground station and two or more satellites associated with a constellation, wherein the knowledge data comprises regulatory limitations on what area of the sky the at least one ground station can cover;
processing the knowledge data according to at least one received mission objective, wherein processing the knowledge data comprises determining, by one or more processors, a capability of each of the plurality of components to collectively achieve the mission objective;
preparing, based on the processing, a mission queue for the plurality of components, wherein the preparing the mission queue comprises determining constraints and priorities of the plurality of components associated with the satellite constellation;
commanding at least one of the plurality of components to take a specified action based at least in part on the mission queue;
initiating, by the at least one ground station, communication with the at least one satellite in the constellation according to the mission queue;
receiving updated status information comprising a status change for at least one component of the plurality of components; and storing, in the resource database, the updated status information.

2. The method of claim 1, wherein processing the knowledge data is performed by a metadata service associated with the satellite control system.

3. The method of claim 1, wherein processing the knowledge data further comprises determining a status of at least one communication link of the satellite constellation communications system, wherein the at least one communication link is capable of communication with the at least one satellite in the constellation according to the mission objective or the mission queue, and wherein determining the status comprises determining a mission capability of the at least one satellite in the constellation.

4. The method of claim 3, wherein the at least one communication link comprises the least one ground station.

5. The method of claim 1, further comprising dynamically revising, by the one or more processors, the mission queue, based on the updated status information.

6. The method of claim 1, wherein initiating, by the least one ground station, comprises configuring a software defined radio associated with the at least one ground station.

7. The method of claim 1, wherein initiating, by the least one ground station, comprises configuring a software defined radio associated with the at least satellite.

8. The method of claim 1, further comprising generating, by the one or more processors, translated commands for communication with at least one of the plurality of components associated with the satellite constellation communications system, wherein generating the translated commands comprises translating high-level commands into a sequence of low-level commands needed for a particular task.

9. The method of claim 1, wherein the constellation comprises at least one CubeSat.

10. The method of claim 1, wherein the satellite constellation communications system comprises one or more of a satellite-based Automatic Identification System (S-AIS) and a GPS Radio Occultation (GPS-RO) system.

11. A satellite constellation communications system comprising:
    a central command and control system configured for communication with at least one satellite associated with a constellation, and by at least one ground station;
    at least one memory for storing data and computer-executable instructions, the at least one memory comprising a resource database configured for storing knowledge data corresponding to a plurality of components associated with the satellite constellation communications system, wherein the plurality of components comprises the at least one satellite associated with the constellation;
    at least one processors in communication with the at least one memory, wherein the at least one processor is further configured to execute the computer-executable instructions to cause the system to:
        receive, from the resource database, the knowledge data, wherein the knowledge data comprises regulatory limitations on what area of the sky the at least one ground station can cover;
        process the knowledge data according to at least one received mission objective, wherein processing the knowledge data comprises determining a capability of each of the plurality of components to collective achieve the mission objective;
        prepare, based on the processing of the knowledge data, a mission queue for the plurality of components, wherein the preparing the mission queue comprises determining constraints and priorities of the plurality of components associated with the satellite constellation;
        command at least one of the plurality of components to take a specified action based at least in part on the mission queue;
        initiate, by the at least one ground station, communication with the at least one satellite in the constellation according to the mission queue;
        receive updated status information comprising a status change for at least one component of the plurality of components; and
        store, in the resource database, the updated status information.

12. The system of claim 11, further comprising a metadata service, wherein processing the knowledge data is performed by the metadata service.

13. The system of claim 11, wherein the at least one processor is further configured to execute the computer-executable instructions to cause the system to determine a status of at least one communication link of the satellite constellation communications system, wherein the at least one communication link is capable of communication with the at least one satellite in the constellation according to the mission objective or the mission queue, and wherein determining the status comprises determining a mission capability of the at least one satellite in the constellation.

14. The system of claim 13, wherein the at least one communication link comprises the least one ground station.

15. The system of claim 11, wherein the at least one processor is further configured to execute the computer-executable instructions to cause the system to dynamically revise the mission queue based on the updated status information.

16. The system of claim 11, wherein the at least one ground station comprises a software defined radio, and wherein the initiating comprises configuring the software defined radio at the at least one ground station.

17. The system of claim 11, wherein the at least one satellite comprises a software defined radio, and wherein the initiating comprises configuring the software defined radio at the at least one satellite.

18. The system of claim 11, wherein the at least one processor is further configured to execute the computer-executable instructions to cause the system to translate at least one command for communication with at least one of the plurality of components associated with the satellite constellation communications system, wherein generating the translated commands comprises translating high-level commands into a sequence of low-level commands needed for a particular task.

19. The system of claim 11, wherein the constellation comprises at least one CubeSat.

20. The system of claim 11, wherein the satellite constellation communications system comprises one or more of a satellite-based Automatic Identification System (S-AIS) and a GPS Radio Occultation (GPS-RO) system.

* * * * *